United States Patent [19]
Ahdoot

[11] Patent Number: 5,913,727
[45] Date of Patent: Jun. 22, 1999

[54] INTERACTIVE MOVEMENT AND CONTACT SIMULATION GAME

[76] Inventor: Ned Ahdoot, 6916 Kings Harbor Dr., Rancho Palos Verdes, Calif. 90275

[21] Appl. No.: 08/874,594

[22] Filed: Jun. 13, 1997

Related U.S. Application Data

[63] Continuation-in-part of application No. 08/456,638, Jun. 2, 1995, abandoned.

[51] Int. Cl.$^6$ ................................ G09G 5/00; A63F 9/22
[52] U.S. Cl. .................................. 463/39; 463/8; 463/40; 463/32; 345/158; 345/156
[58] Field of Search ........................... 463/1, 7–8, 30–36, 463/39, 40, 42; 482/8, 12, 83, 84, 148, 901, 902; 273/148 B; 434/247, 257, 258, 307 R, 314, 365, 392, 43, 45; 348/77, 142, 552, 699; 340/500, 540, 541, 555, 556; 345/112–115, 122, 156, 157, 158

[56] References Cited

U.S. PATENT DOCUMENTS

| | | | |
|---|---|---|---|
| Re. 33,559 | 3/1991 | Fallacaro et al. | 463/30 |
| 4,375,674 | 3/1983 | Thornton | 434/258 |
| 4,542,291 | 9/1985 | Zimmerman | 341/31 |
| 4,563,617 | 1/1986 | Davidson | 313/513 |
| 4,736,097 | 4/1988 | Philipp | 340/556 |
| 4,817,950 | 4/1989 | Goo | 273/148 |
| 4,843,568 | 6/1989 | Krueger et al. | 348/13 |
| 4,925,189 | 5/1990 | Braeunig | 482/902 |
| 4,988,981 | 1/1991 | Zimmerman et al. | 434/45 |
| 5,045,687 | 9/1991 | Gurner | 340/556 |
| 5,130,794 | 7/1992 | Ritchey | 348/383 |
| 5,177,872 | 1/1993 | Lewis | 33/366 |
| 5,185,561 | 2/1993 | Good | 318/432 |
| 5,229,756 | 7/1993 | Kosugi | 340/706 |
| 5,288,078 | 2/1994 | Capper et al. | 463/8 |
| 5,317,689 | 5/1994 | Nack et al. | 395/505 |
| 5,423,554 | 6/1995 | Davis | 463/4 |
| 5,442,168 | 8/1995 | Gurner | 364/410 |
| 5,490,784 | 2/1996 | Carmein | 434/307 R |
| 5,495,576 | 2/1996 | Ritchey | 395/125 |
| 5,524,637 | 6/1996 | Erickson | 482/8 |
| 5,577,981 | 11/1996 | Jarvik | 434/247 |
| 5,583,795 | 12/1996 | Smyth | 364/516 |

OTHER PUBLICATIONS

"CrystalEyes Stereoscopic System for Computer Graphics and Video", by Stereographics Corporation, Mar. 19, 1990, pp. 1–2.
"The Future is Now: Interactive Computer Graphics Allows Trips to New Realities", by Gayle Hanson, The Washington Times, Apr. 12, 1991, p. B7.
"Living in a Virtual World" by Michael Antonoff, Popular Science, Jun. 1993, pp. 82–86 and 124–125.
"Virtual Reality is for Real" by John A Adam, IEEE Spectrum, Oct. 1993, pp. 22–29.
Fisher, et al. ACM Interactive 3D Graphics Oct. 1986, Virtual Environment Display System.

*Primary Examiner*—Mark S. Graham
*Assistant Examiner*—Mark A. Sager
*Attorney, Agent, or Firm*—Gene Scott - Patent Law & Venture Group

[57] ABSTRACT

An interactive contact and simulation game apparatus in which a player and a three dimensional computer generated image interact in simulated physical contact. Alternately two players may interact through the apparatus of the invention. The game apparatus includes a computerized control means generating a simulated image or images of the players, and displaying the images on a large display means. A plurality of position sensing and impact generating means are secured to various locations on each of the player's bodies. The position sensing means relay information to the control means indicating the exact position of the player. This is accomplished by the display means generating a moving light signal, invisible to the player, but detected by the position sensing means and relayed to the control means. The control means then responds in real time to the player's position and movements by moving the image in a combat strategy. When simulated contact between the image and the player is determined by the control means, the impact generating means positioned at the point of contact is activated to apply pressure to the player, thus simulating contact. With two players, each players sees his opponent as a simulated image on his display device.

20 Claims, 3 Drawing Sheets

INTERACTIVE MOVEMENT AND CONTACT SIMULATION GAME

This application is a continuation-in-part of prior filed application Ser. No. 08/456,638, filed on: Jun. 2, 1995, now abandoned.

BACKGROUND OF THE INVENTION

1. Field of the Invention

This invention relates generally to games of interactive play between one or more individuals and a simulation field, such as are found in the popular game arcades and more particularly to a computer controlled interactive movement and contact simulation game in which a player mutually interacts with a computer generated image that responds to the player's movement in real-time and with three-dimensional realistic form.

2. Description of Related Art

Invention and use of computer generated, interactive apparatus are known to the public, as such apparatus are currently employed for a wide variety of uses, including interactive games, exercise equipment, and astronaut training. In his book *Artificial Reality*, Myron W. Krueger discusses many of the different components typically necessary in creating a real-time interactive, computer generated "environment," such components including tactile sensors, body position detection means and motion detectors.

Lewis et al. U.S. Pat. No. 5,177,872 discloses a novel device for determining the position of a person or object. The device is responsive to head or hand movements in order to move a dampened substance contained within a confined tube past one or more sensors. Light passing through the tube is interrupted by the movement of the dampened substance. The intended use of the device, as disclosed, is changing the perspective shown on a video display.

Goo U.S. Pat. No. 4,817,950 teaches a video game controller for surfboarding simulation, and of particular interest is the use of a unique attitude sensing device to determine the exact position of the surfboard. The attitude sensing device employs a plurality of switch closures to determine the tilt angle of the platform and open and close a plurality of electrical contacts enabling a signal input to a computer control unit.

Good et al. U.S. Pat. No. 5,185,561 teaches the principals of tactile feedback through the use of a torque motor. As disclosed, the device consists of a hand held, one dimensional torque feedback device used to manipulate computer generated visual information and associated torque forces.

However, all of these prior art devices merely disclose various components needed to produce a computer generated interface apparatus, but do not disclose a combination of such elements for the establishment of an entire interactive system. Such approaches are well known in the art and are employed in a wide variety of different games and techniques. For example, In *Virtual Environment Display System* (AMC Interactive 3D Graphics, October, 1986), Fisher et al. disclose a fully interactive, head-mounted, wide-angle, stereoscopic display system controlled by operator position, voice and gesture for use as a multipurpose interface environment. The primary applications of the system are in telerobotics, management of large-scale integrated information systems, and human factors research.

Likewise, Kosugi et al. U.S. Pat. No. 5,229,756 disclose a combination of components forming an interactive image control apparatus. The main components of the device are a movement detector for detecting movement, a judging device for determining the state of the operator on the basis of the movement signal provided by the movement detector, and a controller that controls the image in accordance with the movement signal and the judgment of the judgment device. The movement detector, judging device and the controller cooperate so as to control the image in accordance with the movement of the operator. Kosugi requires that a detection means be attached adjacent to the operator's elbow and knee joints so as to measure the bending angle of the extremity and thus more accurately respond to the operator's movements.

The present invention is an inventive combination of a variety of components known in the art, combined in such a way as to monitor the movements of a player or players and generate a three dimensional image that is responsive to the player's movements. The present invention employs a system in which the position of the player is continually monitored without necessitating exact bending angle measurements. Between the simple types of games of combat as typically found in game arcades, wherein the player's is via a simple control joystick and punch-buttons, and the very sophisticated and complex artificial reality types of game wherein the headgear provides a full sensory input structure, and a highly instrumented and wired glove allows manual contact on a limited basis with the simulation, there is a need for a fully interactive game. The present invention takes the approach to simulate a combat adversary image, while allowing the player to exercise every part of his body in combat with the image. This is the final and most important objective. The present invention fulfills these needs and provides further related advantages as described in the following summary.

SUMMARY OF THE INVENTION

The present invention is an interactive movement and contact simulation game apparatus in which a player and a computer generated three-dimensional image mutually interact in a physical contact sport, such as boxing or karate. Alternately, two players may be placed into mutual combat.

The invention consists generally of a computerized control means that is in communication with all components of the game apparatus, including a display means and a plurality of position sensing means and impact generating means which are attached to the player's body. The computer control means generates a visible image on the display means with which the player interacts. The control means also projects a rapidly scanned light signal on the display. This light is received by the position sensing means, the amount of light received by each position sensing means varying in accordance with the player's position with respect to the moving light on the display means. This information is transmitted to the control means, where it is processed to determine the player's exact position with respect to the display means. The computerized control means generates the image in response to the player's movements in real time. The responses of the image include both offensive and defensive moves, the exact type of move being determined by the software program based on the player's current position. Thus, it is a primary object of the invention to provide an inventive interactive game apparatus in which a player can fully participate in a contact sport without the presence of an actual human opponent.

It is another object of the invention to make the simulated sport seem as realistic to the player as possible. This is accomplished in a variety of ways. First of all, a headgear with a three dimensional viewing means is provided to enable the player to view the image with a three dimensional effect. When the control means senses that simulated contact between the player and the image has occurred, it activates the impact generating means at the point of contact to apply pressure to the player, thus simulating actual physical contact. Additionally, sound generating means is preferably provided for increased realism by generating sounds that correspond with the image's simulated interaction with the player.

It is yet another object of the instant invention to ensure that the computer control means is able to track the player's movements with a very high degree of accuracy. This is crucial to the invention, as it enables the image to respond to the players movements instantly, thereby more effectively simulating actual interaction. Thus, the invention preferably includes a plurality of inertial sensing means, attached to the player's body, that are sensitive to changes in the player's velocity. A floor mat with pressure sensitive means contained within it is also preferably provided. The player stands on the mat during play, the pressure sensitive means thus able the determination of the exact location of the player's feet, as well as the force with which the feet are moved. This data allows the computer to more fully determine the player's present position as well as anticipate the player's range and place of motion.

Preferably, the game includes special gear for the player to wear during play. This gear includes a body covering garment, gloves, footgear and headgear with position sensors, impact generators and inertial sensors already appropriately positioned and attached to the gear. If applicable, the gear corresponds to the gear typically worn for the particular sport being simulated, and the gear is lightweight and non-cumbersome so as to allow the player free, unrestricted movement. Thus, it is an object of the invention to provide gear with the necessary sensors and impact generators already included, thereby greatly reducing the time it takes the player to prepare for play.

The present invention lends itself to numerous different applications. For example, the present invention is a significant improvement over standard arcade games that involve simulated physical contact, as these games typically feature two computer generated images, one of which is controlled by the player via buttons or a joystick. However, the present invention adds a whole new dimension to such games, as it allows the player to actually participate in the action, rather than merely watch it unfold. The present invention is also ideal for use as a practice tool for contact sports, such as boxing and karate. The invention is convenient in that it allows a single athlete to participate in the sport without necessitating the need for a human practice partner. It also allows an athlete to select the skill level of the simulated opponent, thus enabling the athlete to tailor the practice session to suit individual needs. Still further, the present invention is ideal for practice purposes, as many of the injuries that frequently arise during contact with a human opponent are not incurred during simulated contact.

Another objective of the present invention is to provide a means for two players to enter into mutual combat without the possibility of injury. In this case, two of the present inventive apparatus are employed. These may be placed in mutual adjacency, in adjacent rooms or may be on different continents as all interaction between the two apparatus are via electronic communication. In this approach, the two players are sensed by their respective apparatus and a simulation of each player is portrayed on the display means of the other player. In this way, the apparatus does not need to develop an artificial opponent, but merely displays the simulated images of the actual opponent players. As the players parry and thrust, punch and protect, the simulated images of each player is realistically portrayed on the opponents display means.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention, a interactive computer controlled game. In such drawings.

DETAILED DESCRIPTION OF THE PREFERRED EMBODIMENTS

Figure 1:
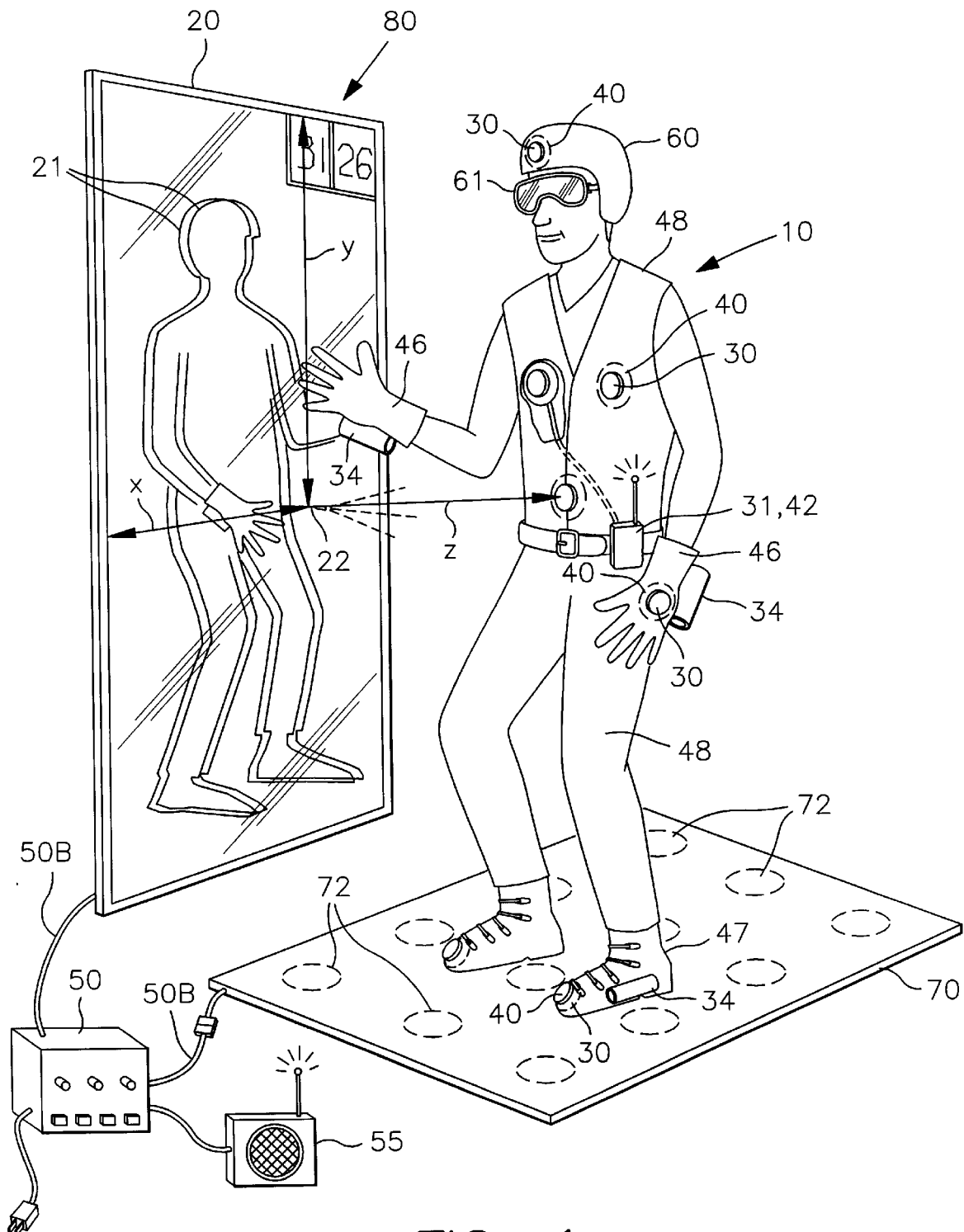
FIG. 1 is a perspective view of the preferred embodiment of the present invention.
Figure 2:
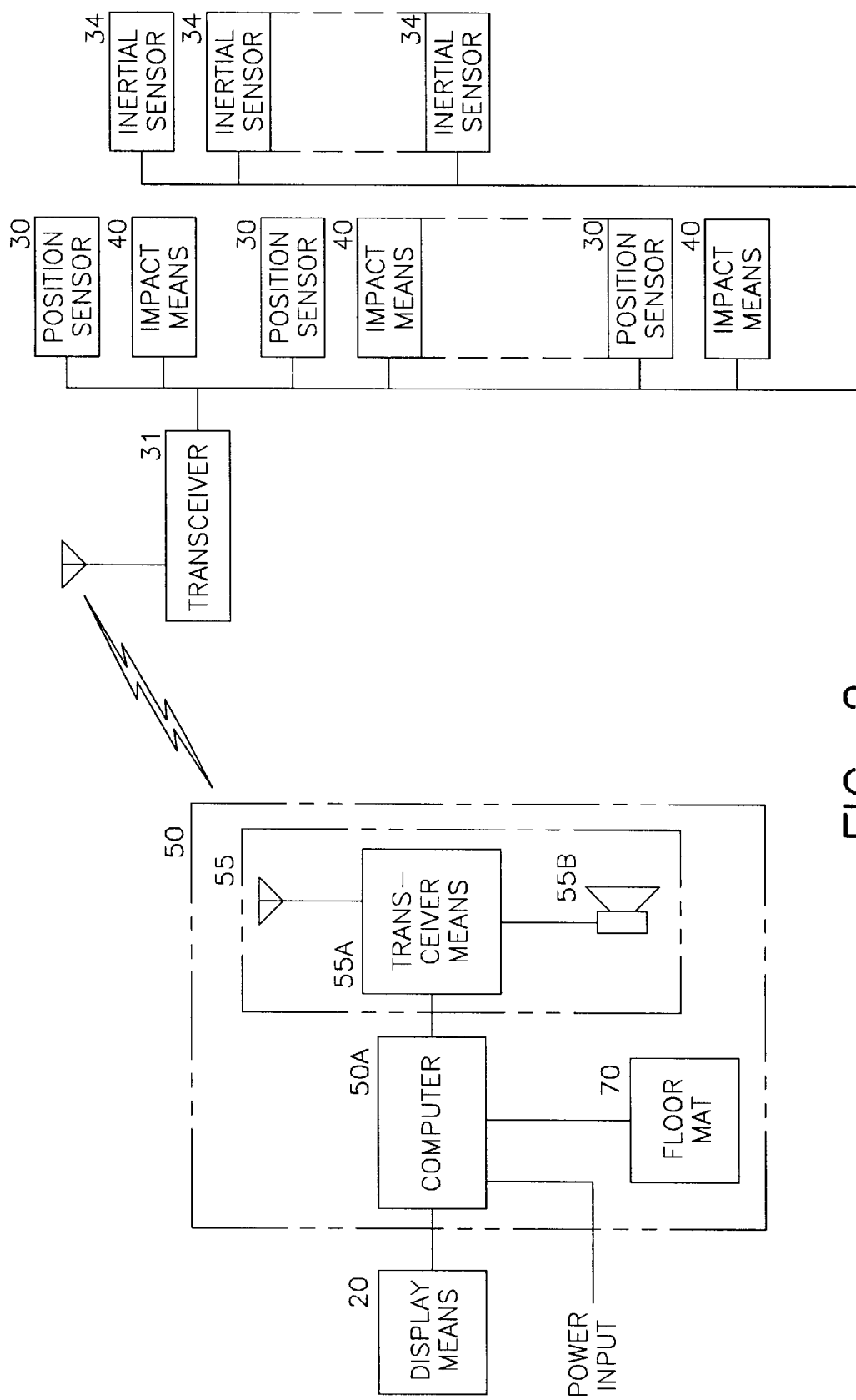
FIG. 2 is a block diagram showing the interrelationship between the major components of the invention.
Figure 3:
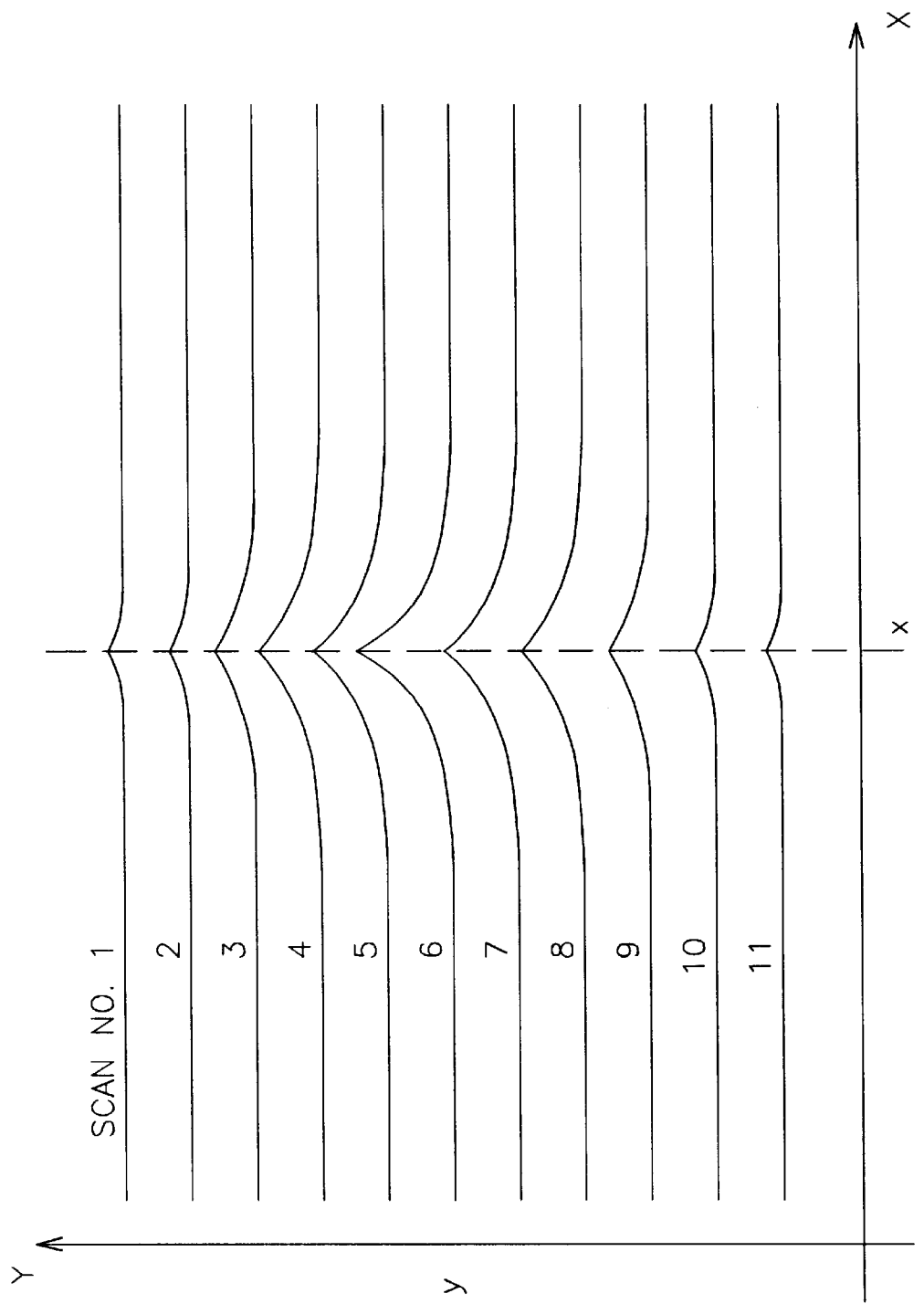
FIG. 3 is a graph showing the signal strength of a series of scans of a light signal projected from the plane of the display means of the invention, wherein each scan moves from left to right in the graph, and subsequent scans occur below previous scans as shown by scan numbers 1 through 11, while the magnitude of signal received is shown by the peaks within each scan, wherein it is shown that the peak of scan 6 has the greatest magnitude thereby indicating that y is the vertical location of the associated sensor on the players body, while all of the peaks indicate that x is the horizontal position of the sensor, and further, that the sensors distance from the plane of the display is indicated by the magnitude of the peak of scan 7, therefore locating that sensor in three-space.

FIGS. 1 and 2 show an interactive movement and contact simulation game apparatus which allows a physical contact sport, such as karate or boxing, to be enacted between a player 10 and a computer generated three dimensional moving image 21, or between a first and a second player, wherein each player combats with a simulated image of the other player.

The computer generated image 21 is displayed by a light emitting display means 20, which preferably consists of a high-resolution CRT screen or other large surface display means such as a video projection television. Preferably, the display means 20 is large enough to display the computer generated image 21 at a size roughly approximating the size of the player, as illustrated in FIG. 1. A three dimensional viewing means 61 is worn over the player's eyes so as to enable the player to view the computer generated image 21 with three-dimensional realism. Such a viewing means is preferably the common type used for viewing motion pictures in 3-D, i.e., a pair of lenses being respectively, horizontal and vertical polarized or having color filters. The image 21 is produced as a double spaced apart image in polarized light or in two colors so that each eye of the player sees only one of the double images, the mind putting the images together as a 3-D single image 21. This type of three-dimensional simulation provides realistic imagery providing for the image to appear to extend into the space directly in front of the display means. We describe a single setup for one player throughout this specification, but for two players, the setup of equipment and devices, etc. are identical for both, although they are positioned apart; in the next room, or on a different continent.

A sequenced light signal 22 of an invisible light wavelength such as in the near infrared or the ultraviolet range is produced on the display means 20. Such an invisible light signal produced as light having a wavelength not within the human visual spectrum, is produced when one of the phosphors used to coat the face or surface of the display means 20 is reactive to a CRT electron beam by emitting in the invisible light range, either ultraviolet or infrared. In the case of a projection TV simulation, the invisible spot on the screen would be produced by a separate or combination light projector where at least one small spot beam is projected as light not visible to the human eye. The light signal 22 is a limited or local illumination of the light producing elements of the display means and is caused to travel, move or scan across the display means, in a time sequenced movement wherein one small portion of the display means is illuminated at any instant. The light signal on the display means is scanned repeatably, in a first X direction such as left to right across the display means, the scans laying in parallel adjacency and proceeding one after the next in a Y direction on the display means such as from the top of the display means to the bottom thereof, in a direction orthogonal to the X direction. Typical scan rates are in the range of from about 60 scans per second, to upward of several hundred scans per second. It should be clear from the foregoing that the image produced on the screen of the display means 20 is produced in the well known manner of the CRT and projection TV methods. The invisible spot is also produced in the same manner by a second electron gun in the case of the CRT screen and by a second light projector as in the case of a projection TV approach. With respect to the CRT case, the screen phosphors used for the production of a visible image may also react to the invisible spot electron beam, however this beam can be made significantly less powerful than that of the visible image beam, and further, the phosphor of the invisible beam can be made with a very short image dwell time so that flicker is minimized. In both cases the visible image and the invisible image are superimposed on the display means.

Numerous body position sensing means 30, preferably an infrared or ultraviolet light sensing device capable of sensing the light signal, and body impact generating means 40, preferably solenoid type thrusters, are fixed, in selected locations, to the player's body in such a way as to move with the player. The body position sensing means 30 and the impact generating means 40 may be fixed, in pairs, to locations on the body, and preferably are constructed as a singular unit. The sensing and generating means, 30 and 40, may be adhered directly to the player's skin or clothing, or, preferably, they are attached to a body covering garment 48, a pair of gloves 46, a pair of footgear 47 such as boots, and a headgear 60 such as a helmet, designed to be worn by the player during play. The three dimensional image viewing means 61 is preferably attached to the headgear 60 or may be separate. When applicable, the construction of the garment 48, gloves 46, footgear 47 and headgear 60 is preferably tailored to correspond in weight and size with the gear typically worn during the particular sport being simulated, i.e., karate, judo, boxing, kickboxing, etc.

The signal response of each of the body position sensing means 30 receiving the light signal 22 grows in amplitude during each scan until reaching a maximum received signal response for each scan. The maximum occurs when the light signal is closest to the particular sensing means 30, i.e., at point x-y in FIG. 1. This maximum response during any of the scans determines an X coordinate of each of the sensing means respectively. The maximum received signal response of each subsequent scan grows in magnitude until reaching a grand maximum magnitude during one scan, the position of the scan containing the grand maximum response determines the Y coordinate for each of the sensing means respectively, as well as the distance Z of each of the sensing means from the display means, determined by signal response magnitude, thereby fixing the exact position of each of the sensing means relative to each other and to the display device in three space, and enabling the control means to form a simulated full body stance, position, posture and dynamic motion approximation of the player in space and time. The scan of the display means is repeated continually during the game in order to continuously update the control means as to the position and dynamic movements of the player. A relative maximum received signal response from each of the body position sensing means determines a physical position of each of the sensing means respectively relative to the first and second direction on the display means, the absolute value of each relative maximum establishing a distance of each of the sensing means from the display means thereby fixing an exact position in space of each of the sensing means relative to each other and to the display means thereby enabling the computerized control means to track approximate body stance, position, posture and motion of the player, or players in the case of opposing players.

The position sensing means 30 are sensitive and responsive only to the particular wavelengths of light of the light signal 22 scanning the display means 20. Each sensing means 30 preferably consists of a photo diode, coded according to its particular location on the player's body. A body-mounted signal transceiver 31 such as a radio wave receiver-transmitter, is interconnected, preferably by wires, to each of the sensing means 30 and impact generating means 40 and carries its own power source. Each impact generating means 40 is also coded according to its particular location on the player's body.

The game apparatus also preferably includes a floor mat 70 placed on the floor directly in front of the display means 20 for the player to move on during play. The floor mat 70 has pressure sensing means 72 positioned within it. As the player moves over the floor mat during play, signals identifying where the feet of the player are positioned and how much force is being exerted by the player's feet at each instance is relayed to the control means 50.

The game apparatus, as illustrated in FIG. 2, is operated by a computerized control means 50, preferably a high speed general purpose microcomputer 50A, and inclues a signal transceiving means 55, including a transceiver 55A, and an audio output means 55B. The control means, again, as illustrated in FIG. 2, is interconnected with display means 20, and floor mat 70 by cables 50B. Transceiver 55A communicates via wireless means with the body mounted signal transceiver 31 carried by the player. Signals are transmitted between the control means 50 and the these components of the game apparatus via wireless wave energy, or, alternately, over transmission lines such as cable 50b. The various player mounted elements require electrical power which is supplied from a battery pack 42 worn by the player.

To use the interactive game apparatus, the player first dons the appropriate gear, including the body garment 48, gloves 46, footgear 47, headgear 60 and viewing means 61. The player may alternately attach the position sensing means 30 and the impact generating means 40 directly to the body.

However, use of the provided gear saves the player a great deal of time, as the sensing and impact generating means are already affixed to the gear in the appropriate locations. Before play is begun, the player stands on the floor mat 70 at a predetermined distance from the display means 20, while the computerized control means 50 reads the light intensities of the scanned light signal 22 received by each of the position sensing means 40. This data is used to calibrate a distance vs. light intensity formula for determining the actual distance from the display means 20 that a sensing means 30 is during play. Calibration is important because the control means 50 must know, not only the horizontal and vertical positions of each of the position sensing means 30, but must also know how far from the display means each of these sensing means 30 is. The scanned light signal 22 moves across and down the display means 20 at a rate of at least 60 complete full displays per second. With respect to this rate, the player appears to the control means 50 to be almost still.

Preferably, an inertial sensing means 34 is attached to one or more parts of the body, and is in communication with the control means via the body mounted transceiver 31. There are numerous possible inertial sensing means 34 known in the art that may be successfully implemented within the scope of the present invention. For instance, the inertial sensing means may be a simple accelerometer of the flexible or pendulous inertial member types, with a closed or open loop circuit. Preferably, the inertial sensing means 34 are positioned on the body garment 48, gloves 46, footgear 47 and headgear 60 so that the control means 50 is able to determine the speed and acceleration at which the player moves his extremities to produce a kick, punch or the like. This information is used to determine the approximate force of each blow, and is further used as a determinant in the game scoring system. The pressure sensing means 72 positioned within the floor mat 70 determines the location of the player's feet and the downward pressure exerted by the feet. This pressure is also factored into formulas determining the force of blows by the feet, and act to help determine scoring. The data from the inertial sensing means 34 and the pressure sensing means 72 is transmitted to the control means 50 by transmission means as described above. In effect, the control means 50 is thereby enabled to form an accurate knowledge of the movement dynamics of the player's body.

Based on the above information, when a single player is playing against the control means 50, the image 21 is moved by the control means 50, to thrust and parry against the moves of the player. In effect, the control means 50 generates the movements of the three dimensional image 21 so as to respond, in real time, to the player's movements with a very high degree of accuracy. The responses of the computer generated image 21 include both offensive and defensive moves. The exact nature of the image's movements is determined by a software program instruction set, which may establish an image 21 that is sluggish in response to the movements of the player or highly anticipatory of such movements.

When the control means 50 determines that a simulated contact between the player and the image 21 has occurred, it signals the particular impact generating means 40 positioned at the approximate location of the simulated contact. The impact generating means 40 applies pressure impulse to the player, thus simulating actual contact with the image 21. Preferably, the control means 50 keeps track of the simulated contacts, and translates them into a score of successful contacts and parries so that the score of the game is automatically kept during play. In this embodiment, the control means 50 preferably projects the score 80 on the wall display means 20 so that it is clearly visible to the player, as illustrated in FIG. 1. Additional information, such as time remaining, set number, etc., in the game, may also be provided on the wall display means 20.

The audio output means 55B, of any type well known in the art, is also preferably activated by the control means 50. The sound generating means 55B provides sounds in response to the interactive movement and simulated contact between the player and the moving image 21. These sounds may be sounds of contact between player and image and may include simulated verbal utterances of the image. A key element to the successful accomplishment of the present invention is the software instruction set which defines the size and shape of the image 21, as well as its ability to move fast or slow, its ability to fend-off blows from the player, and its ability to dispense blows and defend itself. Software for this type of active image is well known in the art and found in any gaming arcade. To this point then, the software instruction for the image 21 will not be discussed here. As to the control instruction set which accumulates and acts upon the data signals arriving at the control means 50, it is also believed that the construction of such a set of instructions is of such common knowledge, that examples are not necessary herein. With respect to the playing of the game with two players, it is a simple alternative, and one fully within the capabilities of one of average skill in the art, to substitute the actual movements of a second player as sensed by a second, remote, apparatus setup, for the instruction set defining the image when played by a single player. Therefore play may proceed with a single player, playing against an image of an imaginary combatant foe, or may proceed with two players, each in dynamic combat with a computer simulated image of the other, said images faithfully following, in simulation, the dynamic movements of the players.

While the invention has been described with reference to a preferred embodiment, it is to be clearly understood by those skilled in the art that the invention is not limited thereto. Rather, the scope of the invention is to be interpreted only in conjunction with the appended claims.

What is claimed is:

1. An interactive movement and contact simulation game apparatus, a game being enacted between a player and an image, the apparatus comprising:

a light emitting video display means producing a computer generated image of a combatant, and also producing a non-visible light signal at a wavelength of light not within the human visual spectrum, on the display means, the non-visible light signal moved with time to sequential positions on the display means;

a plurality of body position sensing means, fixed for moving with the player, and responsive to the non-visible light signal from the display means for determining positions of the body position sensing means relative to the display means, and further including a body-mounted signal transceiving means in communication with the sensing means;

a three dimensional viewing means, worn over the player's eyes, said viewing means enabling the player to see the image on the video display means as a three-dimensional image;

a computerized control means providing a signal transceiving means, in communication with, and responsive to the display means, and the body-mounted signal transceiving means, such that the computerized control means, generates and controls movement of the image on the display means, the movement of the image on the display means reflecting, mimicking and coordinating with movements of the player, such that the player faces and interacts with the combatant.

2. The apparatus of claim 1 wherein the non-visible light signal on the display means is scanned repeatably, in a first direction across the display means, producing a plurality of scans laying in parallel adjacency and proceeding one after another in a second direction on the display means, the second direction being orthogonal to the first direction, so that a relative maximum received signal response from each of the body position sensing means determines a physical position of each of the sensing means respectively relative to the first and second direction on display means, the absolute value of each relative maximum establishing a distance of each of the sensing means from the display means thereby fixing an exact position of each of the sensing means relative to each other and to the display means thereby enabling the computerized control means to track approximate body stance, position, posture and motion of the player.

3. The apparatus of claim 2 further including a plurality of body impact generating means, distributed on, and fixed for moving with the player, such that when the computerized control means identifies a simulated mutual contacting of body parts between the player and a simulated combatant image, from the simulated full body stance, position, posture and motion of the player interacting with the image, the respective impact generating means on the player is activated by the computerized control means via a signal sent therefrom to the signal receiving means on the player such that the player experiences simulated impacts of the punches and kicks of the player as well as simulated impacts from punches and kicks associated with movement of the image.

4. The apparatus of claim 3 wherein the control means translates the simulated impacts into scores, the apparatus further including a score indicia means positioned on the display means.

5. The apparatus of claim 3 further comprising a sound generating means activated by the control means and generating sounds and utterances responsive to the interactive movement and the simulated contacts of the image.

6. The apparatus of claim 3 further comprising a floor mat having feet location and pressure sensing means on a surface directly in front of the display means, and further including a signal transmitting means in communication with the control means sending information from the location and pressure sensing means thereto.

7. The apparatus of claim 3 wherein at least one of the position sensing means is mounted on each one of a pair of combat gloves and on each one of a pair of combat footgear, and on a combat headgear, and on a body covering garment.

8. The apparatus of claim 3 wherein the signals are transmitted by wireless wave energy means.

9. The apparatus of claim 3 wherein the signals are transmitted over transmission lines.

10. The apparatus of claim 3 further comprising an inertial sensing means sensitive to changes in velocity and adapted for attachment to one or more parts of the body, the inertial sensing means producing a signal related to body movements, said body movement related signal transmitted by body-mounted signal transceiving means.

11. An interactive movement and contact simulation game apparatus, for a game being enacted between a pair of players, the apparatus comprising:

a pair of light emitting wall mounted video display means each producing a computer generated image of a one of the players positioned in front of the other on a display means, and also producing a non-visible light signal on each of the display means, the light signal sequentially positioned, in superposition over the generated image, and moved with time to sequential positions on the display means;

a pair of a plurality of body position sensing means, each one distributed on, and fixed for moving with one of the pair of players, and responsive to the light signal from the display means adjacent thereto for determining positions of the players body parts relative to the display means, and further including a pair of body-mounted signal transceiving means, each mounted on one of the players;

a pair of three dimensional viewing means, each one of the viewing means worn over the eyes of one of the players, said viewing means enabling each one of the players to see the image on the display means as a three-dimensional image;

a computerized control means providing a signal transceiving means, in communication with, and responsive to each of the display means, and each of the body-mounted signal transceiving means, such that the computerized control means, generates and controls movement of each of the images on each of the display means, the movement of each image on each of the display devices reflecting, mimicking and coordinated with movements of the one of the players in front of the other one of the display devices, such that each of the players perceives that said player faces and interacts with the other of the players.

12. The apparatus of claim 11 wherein the light signal on each of the display means is scanned repeatably, in a first direction across the display means, a plurality of scans laying in parallel adjacency and proceeding one after another in a second direction on the display means, orthogonal to a first direction, so that a relative maximum received signal response from each of the body position sensing means determines a physical position of each of the sensing means respectively relative to the first and second direction on the display means, the absolute value of each relative maximum establishing, a distance of each of the sensing means from the display means thereby fixing an exact position of each of the sensing means relative to each other and to the display means thereby enabling the computerized control means to track approximate body stance, position, posture and motion for each of the players.

13. The apparatus of claim 12 further including a pair of a plurality of body impact generating means, each one distributed on, and fixed for moving with one of the pair of players, and further including a pair of body-mounted signal transceiving means, each mounted on one of the players, such that when the computerized control means identifies a simulated mutual contacting of body parts between the players, from the simulated full body stance, position, posture and motion of the players, the respective impact generating means on each of the players is activated by the computerized control means via a signal sent therefrom to the signal transceiving means on each of the players, such that each of the players experience simulated impacts of punches and kicks of the players as well as simulated impacts from punches and kicks from the other of the players.

14. The apparatus of claim 13 wherein the control means translates the simulated impacts into scores, the apparatus further including a pair of score indicia means positioned on each of the display means.

15. The apparatus of claim 13 further comprising a pair of sound generating means, one of each being positioned near each of the players, activated by the control means and generating sounds and utterances responsive to the interactive movement and the simulated contacts between the players.

16. The apparatus of claim 13 further comprising for each of the players, a floor mat having feet location and pressure sensing means on a surface directly in front of the each display means respectively, and further including a mat signal transmitting means in communication with the control means sending information from the location and pressure sensing means thereto.

17. The apparatus of claim 13 wherein for each of the players, at least one of the position sensing means is mounted on each one of a pair of combat gloves, at least one of the position sensing means is mounted on each one of a pair of combat footgear, at least one of the position sensing means is mounted on a headgear, and at least one of the position sensing means is mounted on a body covering garment.

18. The apparatus of claim 13 wherein the signals are transmitted by wireless wave energy means.

19. The apparatus of claim 13 wherein the signals are transmitted over transmission lines.

20. The apparatus of claim 13 further comprising a pair of inertial sensing means sensitive to changes in velocity and each adapted for attachment to one or more parts of the body of each of the players, the inertial sensing means producing a signal related to body movements, and further transmitting the signal via the each of the body mounted signal transceiving means, to the computerized control means.

* * * * *